US008963946B2

(12) United States Patent
Tripathi et al.

(10) Patent No.: US 8,963,946 B2
(45) Date of Patent: Feb. 24, 2015

(54) NON-REAL-TIME DITHER USING A PROGRAMMABLE MATRIX

(75) Inventors: Brijesh Tripathi, San Jose, CA (US); Craig M. Okruhlica, San Jose, CA (US); Wolfgang Roethig, San Jose, CA (US)

(73) Assignee: Apple Inc., Cupertino, CA (US)

( * ) Notice: Subject to any disclaimer, the term of this patent is extended or adjusted under 35 U.S.C. 154(b) by 718 days.

(21) Appl. No.: 13/238,023

(22) Filed: Sep. 21, 2011

(65) Prior Publication Data

US 2013/0002703 A1 Jan. 3, 2013

Related U.S. Application Data

(60) Provisional application No. 61/501,916, filed on Jun. 28, 2011.

(51) Int. Cl.
*G06F 12/10* (2006.01)
*G09G 5/04* (2006.01)
*G09G 3/20* (2006.01)

(52) U.S. Cl.
CPC ................ *G09G 5/04* (2013.01); *G09G 3/2051* (2013.01); *G09G 2320/0271* (2013.01)
USPC .......................................................... 345/596

(58) Field of Classification Search
None
See application file for complete search history.

(56) References Cited

U.S. PATENT DOCUMENTS

| | | | | |
|---|---|---|---|---|
| 5,424,755 | A | 6/1995 | Lucas | |
| 5,714,975 | A | 2/1998 | Spackman | |
| 5,798,767 | A | 8/1998 | Poole | |
| 6,154,195 | A | 11/2000 | Young | |
| 6,747,661 | B1 * | 6/2004 | Peterson | 345/589 |
| 2002/0089701 | A1 * | 7/2002 | Lu et al. | 358/443 |
| 2005/0105115 | A1 * | 5/2005 | Hoshi | 358/1.9 |
| 2010/0238193 | A1 | 9/2010 | Neal | |

OTHER PUBLICATIONS

Audacity Mailing list, (http://sourceforge.net/p/audacity/mailman/message/5829143 online since Nov. 2009.*

* cited by examiner

*Primary Examiner* — Xiao Wu
*Assistant Examiner* — Yingchun He
(74) *Attorney, Agent, or Firm* — Lawrence J. Merkel; Meyertons, Hood, Kivlin, Kowert & Goetzel, P.C.

(57) ABSTRACT

A dither unit with a programmable kernel matrix in which each indexed location/entry may store one or more dither values. Each dither value in a respective entry of the kernel matrix may correspond to the number of bits that are truncated during dithering. During dithering of each pixel of an image, entries in the kernel matrix may be indexed according to the relative coordinates of the pixel within the image. A dither value for the pixel may be selected from the indexed entry based on the truncated least significant bits of the pixel component value. When the kernel matrix is storing more than one dither value per entry, the dither value may be selected based further on the number of truncated least significant bits. A dithered pixel component value may then be generated according to the dither value and the remaining most significant bits of the pixel component value.

22 Claims, 7 Drawing Sheets

| Y \ X | 0 | 1 | 2 | 3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |

Kernel 0

| Y \ X | 0 | 1 | 2 | 3 |
|---|---|---|---|---|
| 0 | 1 | 0 | 0 | 0 |
| 1 | 0 | 0 | 0 | 0 |
| 2 | 0 | 0 | 1 | 0 |
| 3 | 0 | 0 | 0 | 0 |

Kernel 1

| Y \ X | 0 | 1 | 2 | 3 |
|---|---|---|---|---|
| 0 | 1 | 0 | 1 | 0 |
| 1 | 0 | 0 | 0 | 0 |
| 2 | 1 | 0 | 1 | 0 |
| 3 | 0 | 0 | 0 | 0 |

Kernel 2

| Y \ X | 0 | 1 | 2 | 3 |
|---|---|---|---|---|
| 0 | 1 | 0 | 1 | 0 |
| 1 | 0 | 1 | 0 | 0 |
| 2 | 1 | 0 | 1 | 0 |
| 3 | 0 | 0 | 0 | 1 |

Kernel 3

| Y \ X | 0 | 1 | 2 | 3 |
|---|---|---|---|---|
| 0 | 1 | 0 | 1 | 0 |
| 1 | 0 | 1 | 0 | 1 |
| 2 | 1 | 0 | 1 | 0 |
| 3 | 0 | 1 | 0 | 1 |

Kernel 4

| Y \ X | 0 | 1 | 2 | 3 |
|---|---|---|---|---|
| 0 | 1 | 1 | 1 | 0 |
| 1 | 0 | 1 | 0 | 1 |
| 2 | 1 | 0 | 1 | 1 |
| 3 | 0 | 1 | 0 | 1 |

Kernel 5

| Y \ X | 0 | 1 | 2 | 3 |
|---|---|---|---|---|
| 0 | 1 | 1 | 1 | 0 |
| 1 | 0 | 1 | 1 | 1 |
| 2 | 1 | 0 | 1 | 1 |
| 3 | 1 | 1 | 0 | 1 |

Kernel 6

| Y \ X | 0 | 1 | 2 | 3 |
|---|---|---|---|---|
| 0 | 1 | 1 | 1 | 1 |
| 1 | 0 | 1 | 1 | 1 |
| 2 | 1 | 1 | 1 | 1 |
| 3 | 1 | 1 | 0 | 1 |

Kernel 7

26

NON-REAL-TIME DITHER USING A PROGRAMMABLE MATRIX

PRIORITY INFORMATION

This patent application claims priority to Provisional Patent Application Ser. No. 61/501,916, filed Jun. 28, 2011, titled “Matrix-Based Dither”, whose inventors are Brijesh Tripathi, Ulrich Barnhoefer, Craig M. Okruhlica, and Wolfgang Roethig, and which is incorporated herein by reference in its entirety as though fully and completely set forth herein.

BACKGROUND

1. Field of the Invention

This invention is related to the field of graphical information processing, more particularly, to image dithering.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a “picture element”, more generally referred to as a “pixel”. For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Information associated with a frame typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Dithering techniques are continually modified and improved to meet the increasing demand for ever-more reliable image fidelity even under conditions when practical limits are placed on the color and/or image resolution.

Other corresponding issues related to the prior art will become apparent to one skilled in the art after comparing such prior art with the present invention as described herein.

SUMMARY

Dithering in image and video processing typically includes intentionally applying a form of noise to randomize quantization error, for example to prevent large-scale patterns, including stepwise rendering of smooth gradations in brightness or hue in the image/video frames. Modules processing pixels of video and/or image frames may therefore be injected with dither-noise during processing of the pixels. In certain dithering algorithms, a single step of dither may be performed from 10 bits per color plane per pixel down to 6 bits per color plane per pixel. In other words, a specified number of bits may be truncated from the original color plane value of the pixel. For example, when dithering from 10 bits per color plane per pixel down to 6 bits per color plane per pixel, the least significant 4 bits of the 10-bit value are truncated/removed from the pixel value per color plane per pixel. However, the resulting video may have visual artifacts.

In one set of embodiments, a dither unit may include a programmable kernel matrix in which each indexed location/entry may store one or more dither values. Each dither value in a respective entry may correspond to a specific number that represents the number of bits that are truncated during dithering. For example, one dither value in the respective entry may correspond to a 2-bit kernel specified for two bits of a pixel component value being truncated, while another dither value in the respective entry may correspond to a 4-bit kernel specified for four bits of a pixel component value being truncated, etc. During dithering of each pixel of an image, entries in the kernel matrix may be indexed according to at least a significant portion of the respective coordinates of each pixel within the image. An appropriate dither value for the respective pixel may be selected from the indexed entry according to the value of the one or more least significant bits of the pixel component value that are to be truncated. In other words, the appropriate dither value for the respective pixel may be selected from the indexed entry according to the truncated least significant bits and the coordinates of the respective pixel within the image.

When the kernel matrix is storing more than one dither value per entry, the appropriate dither value may be selected further based on the number indicative of how many least significant bits are being truncated. Once the appropriate dither value has been selected, the truncated least significant bits are compared to the selected dither value, and if the least significant bits (i.e. the value represented by the least significant bits) are greater than the selected dither value, a binary value of ‘1’ may be added to the remaining most significant bits of the pixel component value to generate the dithered output pixel component value. If the least significant bits are less than or equal to the selected dither value, the remaining most significant bits of the pixel component value may be output as the dithered output pixel component value. In one set of embodiments, the unit may be operating as a non-real-time peripheral in a graphics processing system, for example, interfacing with memory, retrieving the images from memory, performing the dithering operation (sometimes as part of a scaling/rotating function), and storing the result back in memory.

BRIEF DESCRIPTION OF THE DRAWINGS

The following detailed description makes reference to the accompanying drawings, which are now briefly described.

Figure 1:
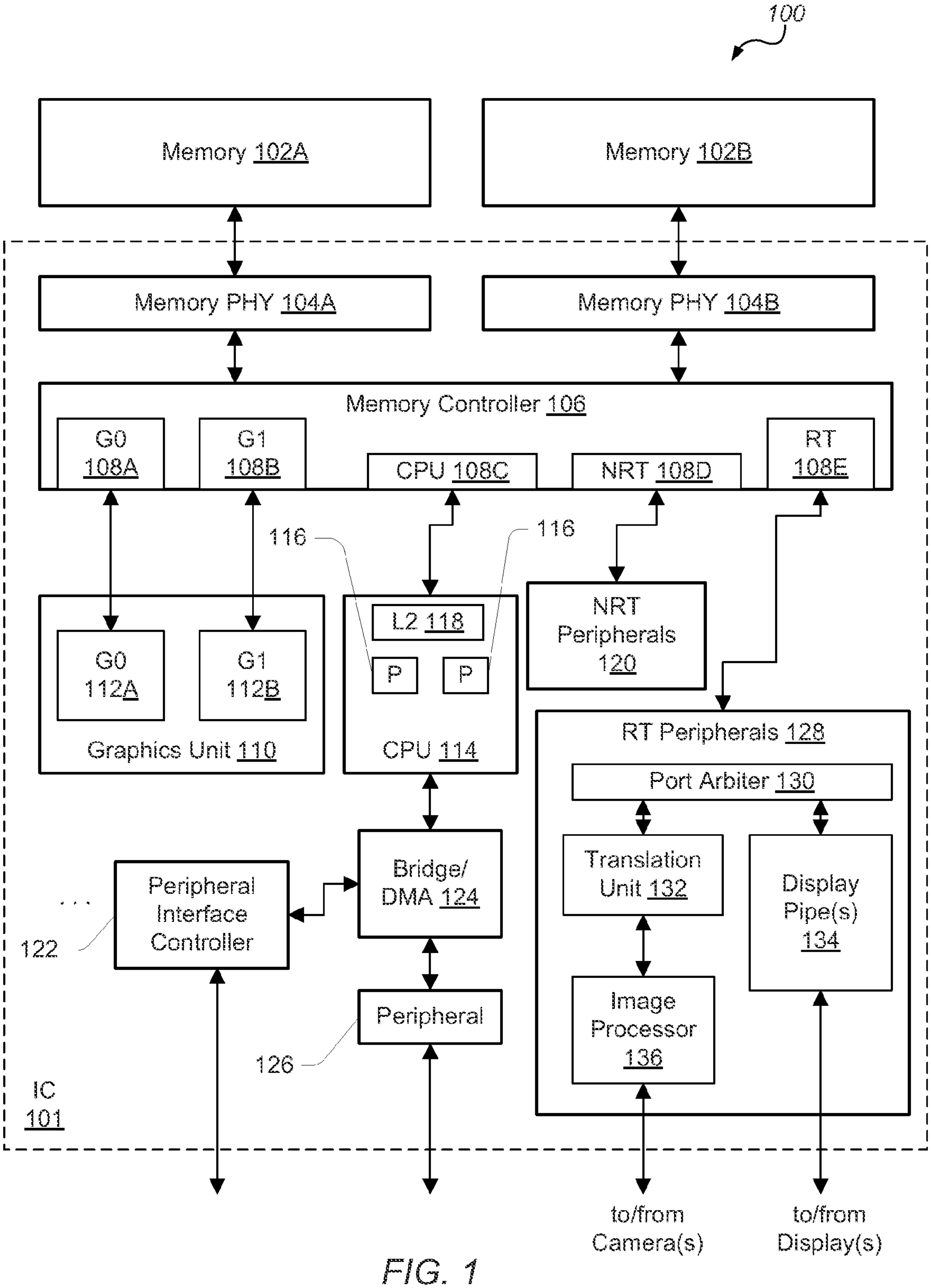
FIG. 1 is a block diagram of one embodiment of system that includes a graphics processing and display unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 is shown. In the embodiment of FIG. 1, system 100 includes an integrated circuit (IC) 101 coupled to external memories 102A-102B. In the illustrated embodiment, IC 101 includes a central processor unit (CPU) block 114, which includes one or more processors 116 and a level 2 (L2) cache 118. Other embodiments may not include L2 cache 118 and/or may include additional levels of cache. Additionally, embodiments that include more than two processors 116 and that include only one processor 116 are contemplated. IC 101 further includes a set of one or more non-real time (NRT) peripherals 120 and a set of one or more real time (RT) peripherals 128. In the illustrated embodiment, RT peripherals 128 include an image processor 136, one or more display pipes 134, a translation unit 132, and a port arbiter 130. Other embodiments may include more processors 136 or fewer image processors 136, more display pipes 134 or fewer display pipes 134, and/or any additional real time peripherals as desired. Image processor 136 may be coupled to receive image data from one or more cameras in system 100. Similarly, display pipes 134 may be coupled to one or more Display Controllers (not shown) which may control one or more displays in the system. Image processor 136 may be coupled to translation unit 132, which may be further coupled to port arbiter 130, which may be coupled to display pipes 134 as well. In the illustrated embodiment, CPU block 114 is coupled to a bridge/direct memory access (DMA) controller 124, which may be coupled to one or more peripheral devices 126 and/or to one or more peripheral interface controllers 122. The number of peripheral devices 126 and peripheral interface controllers 122 may vary from zero to any desired number in various embodiments. System 100 illustrated in FIG. 1 further includes a graphics unit 110 comprising one or more graphics controllers such as G0 112A and G1 112B. The number of graphics controllers per graphics unit and the number of graphics units may vary in other embodiments. As illustrated in FIG. 1, system 100 includes a memory controller 106 coupled to one or more memory physical interface circuits (PHYs) 104A-104B. The memory PHYs 104A-104B are configured to communicate with memories 102A-102B via pins of IC 101. Memory controller 106 also includes a set of ports 108A-108E. Ports 108A-108B are coupled to graphics controllers 112A-112B, respectively. CPU block 114 is coupled to port 108C. NRT peripherals 120 and RT peripherals 128 are coupled to ports 108D-108E, respectively. The number of ports included in memory controller 106 may be varied in other embodiments, as may the number of memory controllers. In other embodiments, the number of memory physical layers (PHYs) 104A-104B and corresponding memories 102A-102B may be less or more than the two instances shown in FIG. 1.

In one embodiment, each port 108A-108E may be associated with a particular type of traffic. For example, in one embodiment, the traffic types may include RT traffic, Non-RT (NRT) traffic, and graphics traffic. Other embodiments may include other traffic types in addition to, instead of, or in addition to a subset of the above traffic types. Each type of traffic may be characterized differently (e.g. in terms of requirements and behavior), and memory controller 106 may handle the traffic types differently to provide higher performance based on the characteristics. For example, RT traffic requires servicing of each memory operation within a specific amount of time. If the latency of the operation exceeds the specific amount of time, erroneous operation may occur in RT peripherals 128. For example, image data may be lost in image processor 136 or the displayed image on the displays to which display pipes 134 are coupled may visually distort. RT traffic may be characterized as isochronous, for example. On the other hand, graphics traffic may be relatively high bandwidth, but not latency-sensitive. NRT traffic, such as from processors 116, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 108A-108E associated with different traffic types, memory controller 106 may be exposed to the different traffic types in parallel.

As mentioned above, RT peripherals 128 may include image processor 136 and display pipes 134. Display pipes 134 may include circuitry to fetch one or more image frames and to blend the frames to create a display image. Display pipes 134 may further include one or more video pipelines, and video frames may be blended with (relatively) static image frames to create frames for display at the video frame rate. The output of display pipes 134 may be a stream of pixels to be displayed on a display screen. The pixel values may be transmitted to a Display Controller for display on the display screen. Image processor 136 may receive camera data and process the data to an image to be stored in memory.

Both the display pipes 134 and image processor 136 may operate in virtual address space, and thus may use translations to generate physical addresses for the memory operations to read or write memory. Image processor 136 may have a somewhat random-access memory pattern, and may thus rely on translation unit 132 for translation. Translation unit 132 may employ a translation look-aside buffer (TLB) that caches each translation for a period of time based on how frequently the translation is used with respect to other cached translations. For example, the TLB may employ a set associative or fully associative construction, and a least recently used (LRU)-type algorithm may be used to rank recency of use of the translations among the translations in a set (or across the TLB in fully associative configurations). LRU-type algorithms may include, for example, true LRU, pseudo-LRU, most recently used (MRU), etc. Additionally, a fairly large TLB may be implemented to reduce the effects of capacity misses in the TLB.

The access patterns of display pipes 134, on the other hand, may be fairly regular. For example, image data for each source image may be stored in consecutive memory locations in the virtual address space. Thus, display pipes 134 may begin processing source image data from a virtual page, and subsequent virtual pages may be consecutive to the virtual page. That is, the virtual page numbers may be in numerical order, increasing or decreasing by one from page to page as the image data is fetched. Similarly, the translations may be consecutive to one another in a given page table in memory (e.g. consecutive entries in the page table may translate virtual page numbers that are numerically one greater than or less than each other). While more than one page table may be used in some embodiments, and thus the last entry of the page table may not be consecutive to the first entry of the next page table, most translations may be consecutive in the page tables. Viewed in another way, the virtual pages storing the image data may be adjacent to each other in the virtual address space. That is, there may be no intervening pages between the adjacent virtual pages in the virtual address space.

Display pipes 134 may implement translation units that prefetch translations in advance of the display pipes' reads of image data. The prefetch may be initiated when the processing of a source image is to start, and the translation unit may prefetch enough consecutive translations to fill a translation memory in the translation unit. The fetch circuitry in the display pipes may inform the translation unit as the processing of data in virtual pages is completed, and the translation unit may invalidate the corresponding translation, and prefetch additional translations. Accordingly, once the initial prefetching is complete, the translation for each virtual page may frequently be available in the translation unit as display pipes 134 begin fetching from that virtual page. Additionally, competition for translation unit 132 from display pipes 134 may be eliminated in favor of the prefetching translation units. Since translation units 132 in display pipes 134 fetch translations for a set of contiguous virtual pages, they may be referred to as "streaming translation units."

In general, display pipes 134 may include one or more user interface units that are configured to fetch relatively static frames. That is, the source image in a static frame is not part of a video sequence. While the static frame may be changed, it is not changing according to a video frame rate corresponding to a video sequence. Display pipes 134 may further include one or more video pipelines configured to fetch video frames. These various pipelines (e.g. the user interface units and video pipelines) may be generally referred to as "image processing pipelines."

Returning to the memory controller 106, generally a port may be a communication point on memory controller 106 to communicate with one or more sources. In some cases, the port may be dedicated to a source (e.g. ports 108A-108B may be dedicated to the graphics controllers 112A-112B, respectively). In other cases, the port may be shared among multiple sources (e.g. processors 116 may share CPU port 108C, NRT peripherals 120 may share NRT port 108D, and RT peripherals 128 such as display pipes 134 and image processor 136 may share RT port 108E. A port may be coupled to a single interface to communicate with the one or more sources. Thus, when sources share an interface, there may be an arbiter on the sources' side of the interface to select between the sources. For example, L2 cache 118 may serve as an arbiter for CPU port 108C to memory controller 106. Port arbiter 130 may serve as an arbiter for RT port 108E, and a similar port arbiter (not shown) may be an arbiter for NRT port 108D. The single source on a port or the combination of sources on a port may be referred to as an agent. Each port 108A-108E is coupled to an interface to communicate with its respective agent. The interface may be any type of communication medium (e.g. a bus, a point-to-point interconnect, etc.) and may implement any protocol. In some embodiments, ports 108A-108E may all implement the same interface and protocol. In other embodiments, different ports may implement different interfaces and/or protocols. In still other embodiments, memory controller 106 may be single ported.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Each memory operation may include a flow ID (FID). The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. In some embodiments, different traffic types may have different definitions of QoS parameters. That is, the different traffic types may have different sets of QoS parameters.

Memory controller 106 may be configured to process the QoS parameters received on each port 108A-108E and may use the relative QoS parameter values to schedule memory operations received on the ports with respect to other memory operations from that port and with respect to other memory operations received on other ports. More specifically, memory controller 106 may be configured to compare QoS parameters that are drawn from different sets of QoS parameters (e.g. RT QoS parameters and NRT QoS parameters) and may be configured to make scheduling decisions based on the QoS parameters.

In some embodiments, memory controller 106 may be configured to upgrade QoS levels for pending memory operations. Various upgrade mechanism may be supported. For example, the memory controller 106 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 106 may be configured to push pending memory operations from the same port or source, but not the same flow, as a newly received memory operation specifying a higher QoS level. As another example, memory controller 106 may be configured to couple to a sideband interface from one or more agents, and may upgrade QoS levels responsive to receiving an upgrade request on the sideband interface. In another example, memory controller 106 may be configured to track the relative age of the pending memory operations. Memory controller 106 may be configured to upgrade the QoS level of aged memory operations at certain ages. The ages at which upgrade occurs may depend on the current QoS parameter of the aged memory operation.

Memory controller 106 may be configured to determine the memory channel addressed by each memory operation received on the ports, and may be configured to transmit the memory operations to memory 102A-102B on the corresponding channel. The number of channels and the mapping of addresses to channels may vary in various embodiments and may be programmable in the memory controller. Memory controller 106 may use the QoS parameters of the memory operations mapped to the same channel to determine an order of memory operations transmitted into the channel.

Processors 116 may implement any instruction set architecture, and may be configured to execute instructions defined in that instruction set architecture. For example, processors 116 may employ any microarchitecture, including but not limited to scalar, superscalar, pipelined, superpipelined, out of order, in order, speculative, non-speculative, etc., or combinations thereof. Processors 116 may include circuitry, and optionally may implement microcoding techniques, and may include one or more level 1 caches, making cache 118 an L2 cache. Other embodiments may include multiple levels of caches in processors 116, and cache 118 may be the next level down in the hierarchy. Cache 118 may employ any size and any configuration (set associative, direct mapped, etc.).

Graphics controllers 112A-112B may be any graphics processing circuitry. Generally, graphics controllers 112A-112B may be configured to render objects to be displayed, into a frame buffer. Graphics controllers 112A-112B may include graphics processors that may execute graphics software to perform a part or all of the graphics operation, and/or hardware acceleration of certain graphics operations. The amount of hardware acceleration and software implementation may vary from embodiment to embodiment.

NRT peripherals 120 may include any non-real time peripherals that, for performance and/or bandwidth reasons, are provided independent access to memory 102A-102B. That is, access by NRT peripherals 120 is independent of CPU block 114, and may proceed in parallel with memory operations of CPU block 114. Other peripherals such as peripheral 126 and/or peripherals coupled to a peripheral interface controlled by peripheral interface controller 122 may also be non-real time peripherals, but may not require independent access to memory. Various embodiments of NRT peripherals 120 may include video encoders and decoders, scaler/rotator circuitry, image compression/decompression circuitry, etc.

Bridge/DMA controller 124 may comprise circuitry to bridge peripheral(s) 126 and peripheral interface controller(s) 122 to the memory space. In the illustrated embodiment, bridge/DMA controller 124 may bridge the memory operations from the peripherals/peripheral interface controllers through CPU block 114 to memory controller 106. CPU block 114 may also maintain coherence between the bridged memory operations and memory operations from processors 116/L2 Cache 118. L2 cache 118 may also arbitrate the bridged memory operations with memory operations from processors 116 to be transmitted on the CPU interface to CPU port 108C. Bridge/DMA controller 124 may also provide DMA operation on behalf of peripherals 126 and peripheral interface controllers 122 to transfer blocks of data to and from memory. More particularly, the DMA controller may be configured to perform transfers to and from memory 102A-102B through memory controller 106 on behalf of peripherals 126 and peripheral interface controllers 122. The DMA controller may be programmable by processors 116 to perform the DMA operations. For example, the DMA controller may be programmable via descriptors, which may be data structures stored in memory 102A-102B to describe DMA transfers (e.g. source and destination addresses, size, etc.). Alternatively, the DMA controller may be programmable via registers in the DMA controller (not shown).

Peripherals 126 may include any desired input/output devices or other hardware devices that are included on IC 101. For example, peripherals 126 may include networking peripherals such as one or more networking media access controllers (MAC) such as an Ethernet MAC or a wireless fidelity (WiFi) controller. An audio unit including various audio processing devices may be included in peripherals 126. Peripherals 126 may include one or more digital signal processors, and any other desired functional components such as timers, an on-chip secrets memory, an encryption engine, etc., or any combination thereof.

Peripheral interface controllers 122 may include any controllers for any type of peripheral interface. For example, peripheral interface controllers 122 may include various interface controllers such as a universal serial bus (USB) controller, a peripheral component interconnect express (PCIe) controller, a flash memory interface, general purpose input/output (I/O) pins, etc.

Memories 102A-102B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 101 in a chip-on-chip configuration, a package-on-package configuration, or a multi-chip module configuration.

Memory PHYs 104A-104B may handle the low-level physical interface to memory 102A-102B. For example, memory PHYs 104A-104B may be responsible for the timing of the signals, for proper clocking to synchronous DRAM memory, etc. In one embodiment, memory PHYs 104A-104B may be configured to lock to a clock supplied within IC 101 and may be configured to generate a clock used by memory 102A and/or memory 102B.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
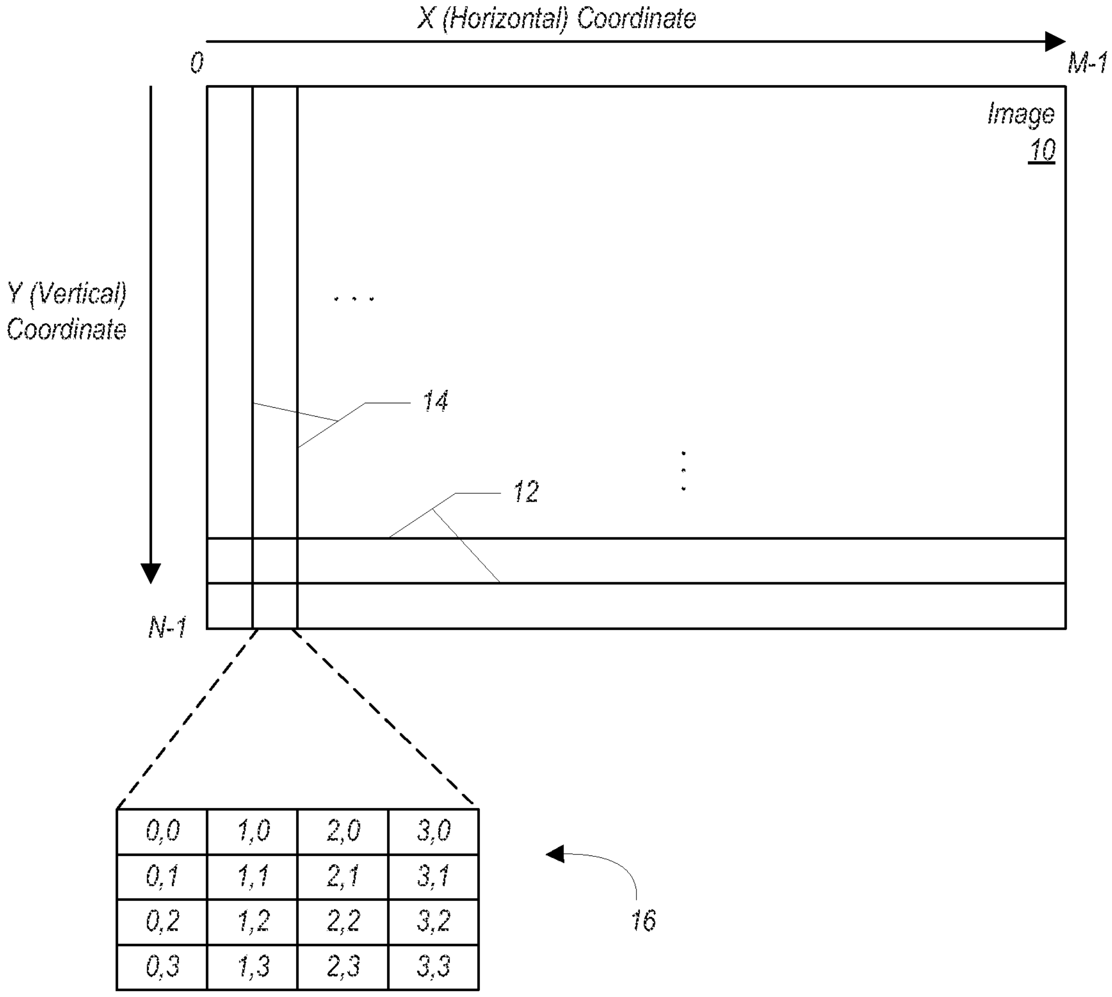
FIG. 2 is a block diagram of one embodiment of an image divided into dither regions.

FIG. 2 is a block diagram illustrating one embodiment of the representation of an image 10. The image 10 may be an arrangement of M-by-N (M×N) pixels, where M is the width of the image in the horizontal direction (measured in pixels) and N is the height of the image in the vertical direction (again measured in pixels). In this example, the uppermost pixel on the left is labeled as pixel zero, and thus pixel addresses (or coordinates) increase to M−1 in the horizontal direction from left to right, and to N−1 in the vertical direction from top to bottom. Accordingly, a given pixel in the image may have an X (or horizontal) coordinate measured from the left side of the image and a Y (vertical) coordinate measured from the top of the image. However, the selection of a given corner of the image 10 as pixel zero (from which the position of other pixels is measured) may be different in other embodiments.

The image 10 may be divided into multiple dither regions. That is, the image 10 may be divided in multiple (e.g. non-overlapping) image segments, with dithering in the image 10 performed per image segment. The regions, or segments are illustrated via horizontal and vertical lines (e.g. lines 12 and 14, respectively in FIG. 2), which may enclose the individual regions as shown. A given dither region may thus be bound by consecutive lines 12 and consecutive lines 14 as illustrated in FIG. 2. The regions may be of any desired size in various embodiments. In one embodiment, the dither regions are 4×4 squares of pixels. For example, a magnified, detailed version of a dither region 16 is shown through an exploded view for a 4×4 region in FIG. 2. Again, based on the upper left corner of the region being pixel zero, the pixels are illustrated according to their X and Y coordinates from the upper left corner of the dither region 16. Since the region 16 is a 4×4 square and the first region (i.e. region 1) includes pixel zero of the image 10, the least significant two bits of the X and Y coordinates of a pixel within the image 10 also represent the coordinates of that pixel within a select 4×4 square region, for example within region 16.

Each pixel in the image 10 may be represented by one or more pixel components. The pixel components may include color values for each color in the color space in which the image is represented. For example, the color space may be the red-green-blue (RGB) color space. Each pixel may thus be represented by a green component, a blue component, and a red component. The value of each component may represent a brightness or intensity of the color corresponding to that component in that pixel. When the red, green, and blue colors are displayed at the requested intensity, the pixel appears to the human eye to be of a particular color. Increasing or decreasing one or more of the component values changes the perceived color. Other color spaces may also used, such as the YCbCr color space, in which image information is separated into Chrominance (chroma or C for short, where Cb represents the blue-difference chroma component and Cr represents the red-difference chroma component) and Luminance (luma, or Y for short) information. The chrominance components are used to convey the color information separately from the accompanying luminance component, which represents the "black-and-white" or achromatic portion of the image, also referred to as the "image information". Furthermore, additional pixel components may be included. For example, an alpha value for blending may be included.

Each pixel component may include a particular number of bits, representing color intensities from least intense (or transparent) to most intense. For example, each color component may include 10 bits per pixel, permitting 1024 levels of intensity per component. However, some displays may not be capable of 1024 levels of intensity, and may thus support fewer levels of intensity per pixel. For example, 8 or 6 bits per pixel may be supported.

In order to display an image having more bits per pixel component (higher precision pixel components) on a display that supports fewer bits per pixel component (lower precision pixel components), the pixel components may be converted to the lower precision. One simple way to convert the component data is using least significant bit (LSB) truncation. That is, the difference between the higher and lower precision (as measured in numbers of bits) may be equal to a number of least significant bits of each component that are dropped to produce the component value at the lower precision. Other mechanisms may also be used. Such transformations introduce a quantization error in the components, which may be manifested as visible artifacts in the displayed image(s).

For example, a common test pattern for displays is a ramp pattern. In a ramp, a color component begins with a zero for the pixels on one side of the image, and gradually increases from pixel to pixel up to its maximum value at the other side of the image. For example, the ramp may be displayed from left to right or top to bottom. In its original form, a smooth transition in color may be visible on the display. However, when the data needs to be modified to reduce the component precision, the ramp may develop artifacts. Specifically, if LSB truncation is used, step changes in the color components may occur. The truncated value may be the same for several pixels (i.e. 2p pixels, where "p" is the number of bits truncated when LSB truncation is used). Then, the truncated component may change to the next value. Consequently, the resulting image exhibits a stair step pattern rather than a smooth ramp.

To reduce the visibility of such artifacts (or to prevent them), the pixel components may be dithered according to a dither algorithm. Generally, the dithering algorithm may apply pseudo-random noise to the decreased precision values, to reduce the average quantization error and thus produce an image that more accurately reflects the original (higher precision) image. In other words, the dithering algorithm may be used to produce a reduced-precision image that looks as close or identical to the original image as possible. Viewed another way, dithering may reduce the loss of visual image information, even though fewer bits are used to represent each pixel component.

The dithering mechanism described herein may apply dithering to a pixel based on the location of the pixel with its dither region 16. That is, if the same pixel component values are present at two different locations in the dither region 16, the resulting dithered output pixels may differ. Thus, an area of approximately constant color which is not accurately represented at the lower precision (e.g. the LSBs that are lost in the truncation are non-zero) may be more accurately portrayed because the component values vary between two values that bound the more accurate, higher precision value. Accordingly, less abrupt changes in the dithered image may often be the result.

Figures 3, 4:
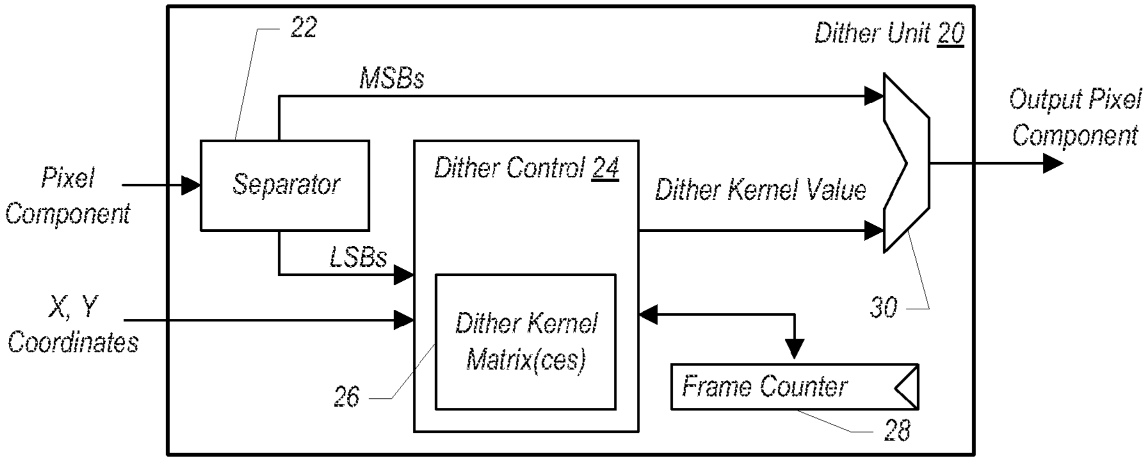
FIG. 3 is a block diagram of one embodiment of a dither unit.
FIG. 4 is a block diagram of one embodiment of kernel dither matrices.

FIG. 3 is a block diagram of one embodiment of a dither unit 20. In the illustrated embodiment, the dither unit 20 includes a separator 22, a dither control circuit 24 that includes one or more dither kernel matrices 26, a frame counter register 28, and an adder 30. The dither unit 20 is coupled to receive a pixel component value in the original precision, along with the X and Y coordinates of the pixel component (or at least a portion of the X and Y coordinates). More particularly, the separator 22 may be coupled to receive the pixel component value, and may be coupled to provide most significant bits (MSBs) to the adder 30 and LSBs to the dither control circuit 24. The dither control circuit 24 may further be coupled to receive the X and Y coordinates, and may be coupled to the frame counter register 28. The dither control circuit 24 may be configured to generate a dither kernel value to the adder 30, which may generate an output pixel component at the lower resolution for display.

The separator 20 may be configured to route the MSBs of the pixel component value that are to be retained (e.g. a number of MSBs equal to the output precision). The dither unit 20 may, in some embodiments, be programmable for more than one output precision and thus the number MSBs provided may vary based on the programming. Particularly, the separator 20 may be configured to zero the LSBs of the MSBs that are not being carried through in the output pixel component. Accordingly, the width of the input (providing the separated out MSBs) to the adder 30 may be fixed, but the value of one or more LSBs of the MSBs may be zero in some embodiments.

Additionally, the separator 20 may be configured to provide LSBs of the pixel component value that may be used by the dither circuit 24 to generate the dither kernel value. In some embodiments, the LSBs may include each bit that is not included in the MSBs. Alternatively, one or more LSBs of the input pixel component may be dropped from the LSBs provided to the dither control circuit 24, as described in more detail below with regard to FIG. 4.

The separator 22 may effectively perform LSB truncation on the input pixel component value, by zeroing LSBs (i.e., by setting to zero the value of the LSBs) that are not used, and providing the remaining MSBs to the adder 30. This process, if no further action is taken, introduces a quantization error. The size of the error varies depending on the value of the LSBs that were truncated. That is, the correct value may be closer to the truncated value when the LSBs represent a small number, or closer to the truncated value plus one when the LSBs represent a larger number. If the LSBs are viewed as the fractional part of a number that results from dividing the original pixel component by '2p−1', the correct value is nearer the truncated value if the fractional part is less than ½, and the correct value is nearer the truncated value plus one if the fractional part is greater than ½.

The dither control circuit 24 may be configured to generate the dither kernel value to be added to the truncated pixel component value. Accordingly, the dither kernel value may be either zero or one in the LSB position of the output pixel component (e.g. a one to be added to the LSB of the truncated component value). Within a dither region, the pixel components for each pixel may often be similar. Accordingly, dithering the pixel components in the region based on location and the value of the LSBs that are being truncated may lead to a more accurate final image. Specifically, the larger the LSBs, the more often a value of one should be added to the truncated value to approximate the original color in the region. For brevity in the remainder of this disclosure, the truncated component value is referred to as a 'floor' and the truncated component value plus one is referred to as the 'ceiling'.

The dither control circuit 24 may include one or more dither kernel matrices 26. The dither control circuit 24 may generate the dither kernel value based on the content of the dither kernel matrices 26, the LSBs of the pixel component value, and the X and Y coordinates. More particularly, certain LSBs of the X and Y coordinates may be used based on the size of the dither region 16. Thus, in the present example representative of an embodiment in which a 4×4 dither region is implemented, the two LSBs of the X coordinate and the two LSBs of the Y coordinate are used.

Each dither kernel matrix of the dither kernel matrices 26 may include a respective value for each coordinate location in the dither region 16. The dither control circuit 24 may be configured to select an entry from the dither kernel matrices 26 based on the coordinates, and may be configured to generate the dither kernel value responsive to the selected value. The dither kernel matrices 26 may be programmed with a higher number of respective entries having a dither kernel value of '1' for larger values of the LSBs of the pixel component value than for smaller values of the LSBs of the pixel component value. For example, Kernel 6, which may correspond to a higher value of the LSBs of the pixel component value than Kernel 4 may have a greater number of entries that have a value of '1' than Kernel 4, while Kernel 4, which may correspond to a higher value of the LSBs of the pixel component value than Kernel 3 may have a greater number of entries that have a value of '1' than Kernel 3, and so on and so forth. Accordingly, on average, for larger values of the LSBs of the pixel component value, the ceiling may be generated more frequently than the floor as the output pixel component within the dither region 16. For smaller values of the LSBs, the floor may be generated more frequently as the output pixel component within the dither region 16. In both cases, the result may more closely approximate the original color in the region.

The dither unit 20 may be implemented in a variety of larger functional units within an integrated circuit. For example, the dither unit 20 may be included in a display pipe that reads frames from a source for display, for example within display pipe(s) 134 shown in FIG. 1. The frames may be displayed at a desired frame rate (e.g. 24 frames per second (fps), 30 fps, 60 fps, etc.). The frames may be part of a video sequence, or they may be frames rendered by a graphics processor. In any case, consecutive frames may often have similarity, and may benefit from a temporal dither in addition to the spatial dither provided by the dither kernel matrices 26. That is, the likelihood of visible artifacts may be further reduced in a temporal dither. To support temporal dither, control unit 24 may be coupled to the frame counter register 28, and the frame counter register 28 may be incremented at the start of each frame.

The temporal dither mechanism, in one embodiment, may include logically dividing the dither kernel matrix 26 into smaller sub-matrices, and logically rotating the dither kernel matrix contents within each sub-matrix for successive frames. Accordingly, assuming that the pixels within the region are the same as or similar to the pixels in the previous frame, the result of the dithering may be different for the successive frames and thus any visual artifacts may be averaged out over time. Additional details are provided below with regard to FIG. 5.

In other embodiments, the dither unit 20 may be implemented within a larger functional unit that does not necessarily process consecutive frames. For example, a scaler and/or rotator may be provided to offload scaling and/or rotating operations from a graphics processor, CPU, or other image generation/processing hardware, and dither unit 20 may be implemented as part of this scaler/rotator unit. In yet other embodiments, dither unit may be implemented in a display controller interface, or other components, portions of the system where dithering is to be performed. In one set of embodiments, a scaler/rotator unit that incorporates dither unit 20 may be one of the NRT peripherals 120, shown in FIG. 1, interfacing with memory controller 106 through NRT port 108D, to transfer data and information to and from memory 102A and/or memory 102B. The scaler/rotator may read image data from memory, perform the requested operations, and write the scaled/rotated image data back to memory. In such embodiments, there is no indication that the consecutive frames being operated on by the scaler/rotator are related. In such embodiments, the temporal dithering may be eliminated and the frame counter register 28 may not be used.

In one embodiment, the dither kernel matrices 26 may be programmable as desired to vary the dithering that occurs in a given image. In addition to the programmability, a default value may be automatically programmed into the matrices 26 (or may be provided to the programmer to be used if no particular matrix programming is desired by the programmer). In other embodiments, the matrices 26 may be fixed in hardware.

While the dither unit 20 has been described as operating on a pixel component, other embodiments may operate on multiple pixel components in parallel (e.g. all the components of a pixel may be processed in parallel, components from multiple pixels may be processed in parallel, etc.). Additionally, multiple dither units 20 may be used to operate in parallel as well.

Turning now to FIG. 4, a block diagram of one embodiment of a set of kernel matrices 26 is shown. In the embodiment of FIG. 4, a kernel matrix may be selected in response to the LSBs of the pixel component value, and a matrix entry within the selected kernel matrix may be selected based on the respective X and Y coordinates of the pixel. The value in the selected matrix entry may become the dither kernel value in this embodiment. That is, the dither kernel value is either zero or one. If the selected value is zero, the dither kernel value may be ‘0’. If the selected value is one, the dither kernel value may be ‘1’ in the LSB position of the truncated MSBs provided to adder unit 30.

The set of matrices 26 shown in FIG. 3 may be used for truncation of one, two, or three LSBs. For a truncation of one LSB, (e.g. when going from 10-bit resolution to 9-bit resolution), the matrices labeled Kernel 0 and Kernel 4 may be used. An LSB value of ‘0’ may cause the selection of Kernel 0, and an LSB value of ‘1’ may cause the selection of Kernel 4. For truncation of two LSBs, the Kernel matrices 0, 2, 4, and 6 may be used for LSB values of 0 (b'00—i.e., a 2-bit binary value of ‘00’), 1 (b'01), 2 (b'10), and 3 (b'11), respectively. For truncation of three LSBs, all kernel matrices are used for their respective LSB values (i.e. from b'000 to b'111, corresponding to Kernel 0 to Kernel 7, respectively).

As previously pointed out, the population of ‘1’ values in each kernel matrix of kernel matrices 26 in FIG. 4, the incidence of ‘1’ increases as the LSB value increases. For an LSB value of zero, the floor is correct. Accordingly the Kernel 0 matrix is filled with ‘0’s. For an LSB value of 1, the value of ‘1’ appears in the matrix twice, to cause two out of sixteen (or one out of eight) pixel components in the region to be dithered to the ceiling (and the remainder to the floor). Similarly, the value of ‘1’ appears four times in the Kernel 2 matrix, six times in the Kernel 3 matrix, etc. As another example, Kernel 4 (where the LSBs are closest to ½ of the distance between the floor and the ceiling), the value of ‘1’ appears in eight respective entries of the 16 matrix entries, and thus the floor and the ceiling may be used equally over the dither region 16 in this case.

The ‘1’ values in each matrix may be spatially distributed such that the occurrences of the ceiling within the region 16 are distributed, given a more even averaging over the region. However, in other embodiments, the ‘1’ values may be distributed in a different manner, depending on the requirements and/or desired results.

As mentioned above, the matrices 26 shown in FIG. 4 support truncations of one, two, or three bits. In one embodiment described previously, reduction from 10 bits per component to either 8 bits or 6 bits is performed. Accordingly, the one bit truncation is not used in such an embodiment. Additionally, the truncation of 4 bits is not directly supported by the embodiment in FIG. 4, since there are only a total number of eight kernels. To support truncation of 4 bits according to the kernel method described above, sixteen (instead of eight) Kernel matrices may be used. However, it may not be desirable from a design efficiency standpoint to provide sixteen such matrices. As a compromise, eight matrices (e.g. as shown in FIG. 4) may be used, and when 4-bit truncation is performed, the LSB of the input component may be dropped prior to accessing the matrices 26 (leaving the 3 remaining LSBs). In other embodiments, the full sixteen matrices may be provided for 4-bit truncation. In such an embodiment, each consecutive matrix would include one more binary ‘1’ than the previous matrix. In one set of embodiments, the distribution of the ‘1’ values may be similar to that shown in FIG. 4.

It is noted that, in general, more or fewer matrices 26 may be provided to support larger or smaller reductions in the pixel component values.

Figure 6:
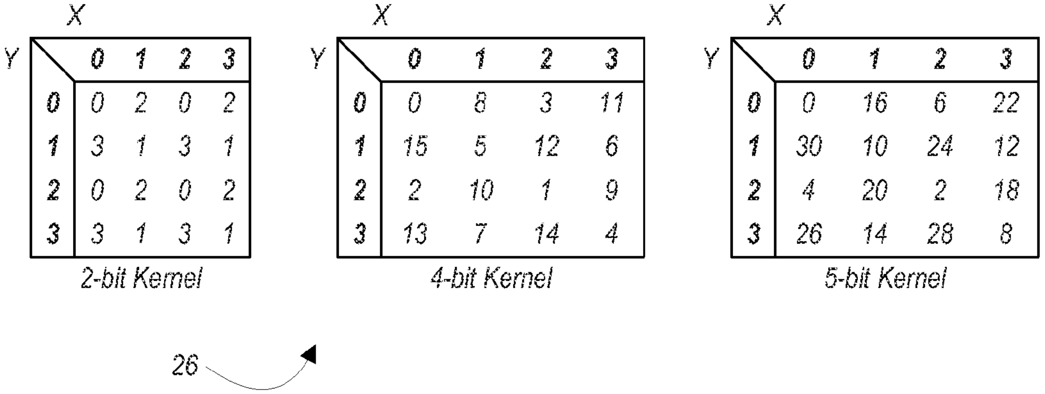
FIG. 6 is a block diagram of one embodiment of dither matrix rotation.

FIG. 6 is a block diagram illustrating another embodiment of the kernel matrices 26. The matrices 26 shown in FIG. 6 implement a threshold value in each matrix entry. The matrix entry may be selected based on the respective X and Y coordinates, and the value stored in the matrix entry may be compared to the value represented by the LSBs of the pixel component value input to the dither control circuit 24. If the input value represented by the LSBs is greater than the selected value, the dither control circuit 24 may generate a dither kernel value of ‘1’ in the LSB position of the MSBs. If the input value represented by the LSBs is less than or equal to the selected value, the dither control circuit 24 may generate a dither kernel value of ‘0’ in the LSB position of the MSBs.

Figure 7:
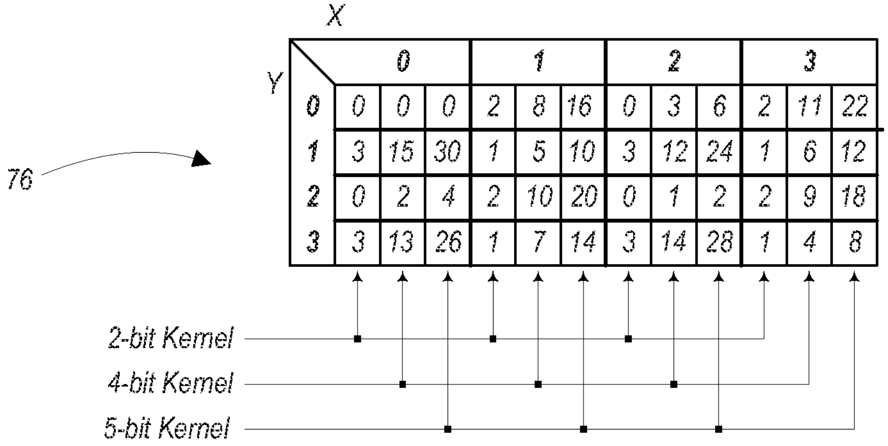
FIG. 7 is a block diagram of one embodiment of a single programmable kernel dither matrix.

Accordingly, for a given number of bits of reduction, one matrix 26 may be used in this embodiment. The embodiment illustrated in FIG. 6 supports, e.g., 2-bit, 4-bit, and 5-bit reductions. In another embodiment, one matrix 26 may be implemented for all the supported reductions. Each matrix entry in such an embodiment may store the corresponding values from each of the three matrices illustrated in FIG. 6. In such an embodiment, a matrix entry may be selected using the X and Y coordinates, and the correct value from among all values stored in the selected matrix entry may be selected based on the number of bits of reduction that are currently in effect. One example of such a kernel matrix 76 is shown in FIG. 7. The matrix may still represent a 4×4 square corresponding to dither region 16 shown in FIG. 2. However, instead of a single entry corresponding to each coordinate, each indexed entry contains three values, each value corresponding to a different number of bits of reduction. Thus, for example, indexed location (0,1) contains values 3, 15, and 30, corresponding to a 2-bit, 4-bit, and 5-bit kernel, respectively.

The values in the matrices 26 (and 76) shown in FIG. 6 may be specified to spatially distribute the ceilings for a given LSB value over the dither region, as well as to generate more ceilings over the dither region for larger LSB values than for smaller LSB values. For example, considering the 2-bit kernel matrix, LSBs of '0' are not greater than any entries in the matrix and thus the output dither kernel value may be zero for each location in the region (similar to the kernel zero matrix in FIG. 4). LSBs of '1' are greater than the entries for X=0, Y=0; X=0, Y=2; X=2, Y=0; and X=2, Y=2 (similar to kernel matrix 2 in FIG. 3), etc.

Figure 5:
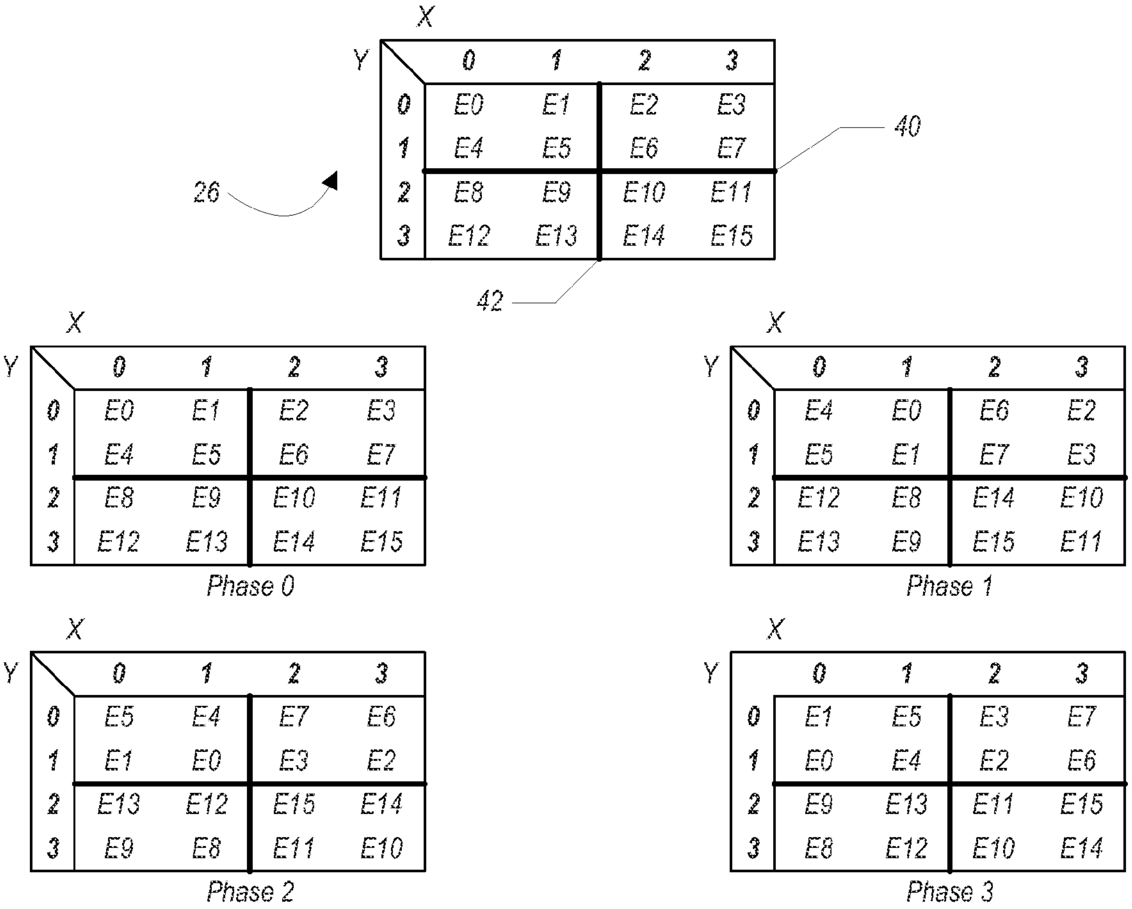
FIG. 5 is a block diagram of another embodiment of kernel dither matrices.

The matrices 26 (and 76) may be programmable or fixed, similar to the discussion above with regard to FIG. 4. However, the default values shown in FIG. 6 may be provided for use if the programmer does not wish to determine his/her own values. FIG. 5 is a block diagram illustrating temporal dithering for one embodiment of the dither unit 20. The temporal dithering may be applied to the matrices 26 of the form shown in FIG. 4 or FIG. 6, or any other form of matrices (e.g. matrix 76). At the top of FIG. 5, the matrix 26 is shown in its "normal" configuration. The entries are numbered E0 to E15 to facilitate illustration of the rotation of entries. Also shown in the normal configuration are two heavy lines 40 and 42. The lines 40 and 42 divide the matrix 26 into four 2×2 sub-matrices. The entries in a given sub-matrix may be effectively rotated between frames, changing the output of the dithering from frame to frame. Accordingly, if any visual artifacts are created by the dithering, those artifacts may be averaged out over time and may not be detectable by the human eye (or may be less detectable by the human eye).

Phases 0, 1, 2, and 3 illustrate the rotations that may be performed on each sub-matrix. Phase 0 is the same as the "normal" configuration, and thus the entries E0 to E15 remain in the same locations as they are in the matrix 26 at the top of FIG. 5. Phase 1 illustrates a clockwise rotation by one entry in each sub-matrix. Thus, entry E0 is now in location X=1, Y=0 instead of X=0, Y=0. Similarly, entry E1 has rotated from X=1, Y=0 to X=1, Y=1, etc. Each other sub-matrix has been rotated in the same way. Phase 2 illustrates a clockwise rotation by two entries from Phase 0, or a clockwise rotation of one entry from Phase 1. Phase 3 is a clockwise rotation by three entries from Phase 0, or one entry from Phase 2. If Phase 3 were rotated clockwise by one more entry, the result would be the Phase 0 matrix again.

The rotation may be accomplished in any desired fashion. The values may actually be moved from one entry to another, for example. Alternatively, logic outside of the matrix 26 may select different entries for a corresponding set of coordinates, based on the current phase.

The order of the phases may be varied, in some embodiments. The order may be programmably selected, for example. Changing the order may be used to achieve better results for different displays, which may have different flickering patterns that may interact with the dithering in different ways. Different phase orders may be used for different pixel components of the same pixel (e.g. different orders may be used for red, green, and blue components or Y, Cr, and Cb components). Additionally, the rotation may be programmable as clockwise our counterclockwise in some embodiments.

Figure 8:
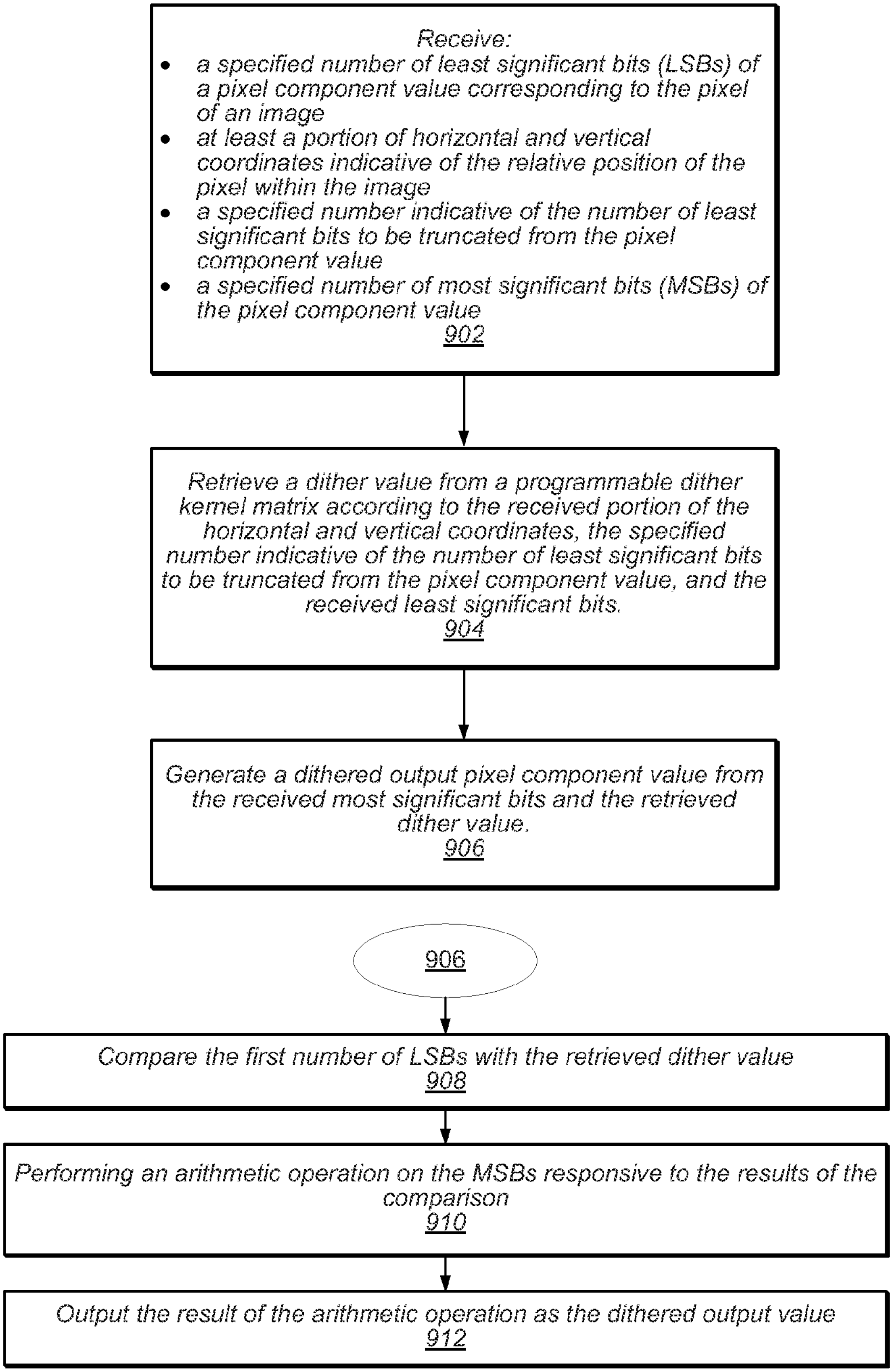
FIG. 8 is a flowchart of one embodiment of a method for performing dithering on an image.

FIG. 8 shows a flowchart of one embodiment of a method for performing dithering on an image. The embodiment of the method shown in FIG. 8 includes receiving: a first number of least significant bits (LSBs) of a pixel component value corresponding to the pixel of an image, at least a portion of the horizontal and vertical coordinates indicative of the relative position of the pixel within the image, a specified number indicative of the number of least significant bits to be truncated from the pixel component value, and a specified number of most significant bits (MSBs) of the pixel component value (902). Subsequently, a dither value is retrieved from a programmable dither kernel matrix (e.g. one of kernel matrices 26 in FIG. 6 or kernel matrix 76 in FIG. 7) according to the received portion of the horizontal and vertical coordinates, the specified number (indicating the number of least significant bits to be truncated from the pixel component value), and the received least significant bits (904). Then, a dithered output pixel component value is generated from the received most significant bits and the retrieved dither value (906).

In some embodiments, generating the dithered output pixel component value (906) may include comparing the first number of LSBs with the retrieved dither value (908), performing an arithmetic operation on the MSBs responsive to the results of the comparison (910), and outputting the result of that arithmetic operation as the dithered output value (912). More specifically, the arithmetic operation may include adding a binary value of '1' to the MSBs in response to the comparison indicating that the first number of LSBs is greater than the retrieved dither value, and adding a binary value of '0' to the MSBs in response to the comparison indicating that the first number of LSBs is less than or equal to the retrieved dither value. Furthermore, retrieving the dither value from the programmable dither kernel matrix may include selecting one of multiple stored dither values according to the specified number indicative of the number of least significant bits to be truncated from the pixel component value.

Figure 9:
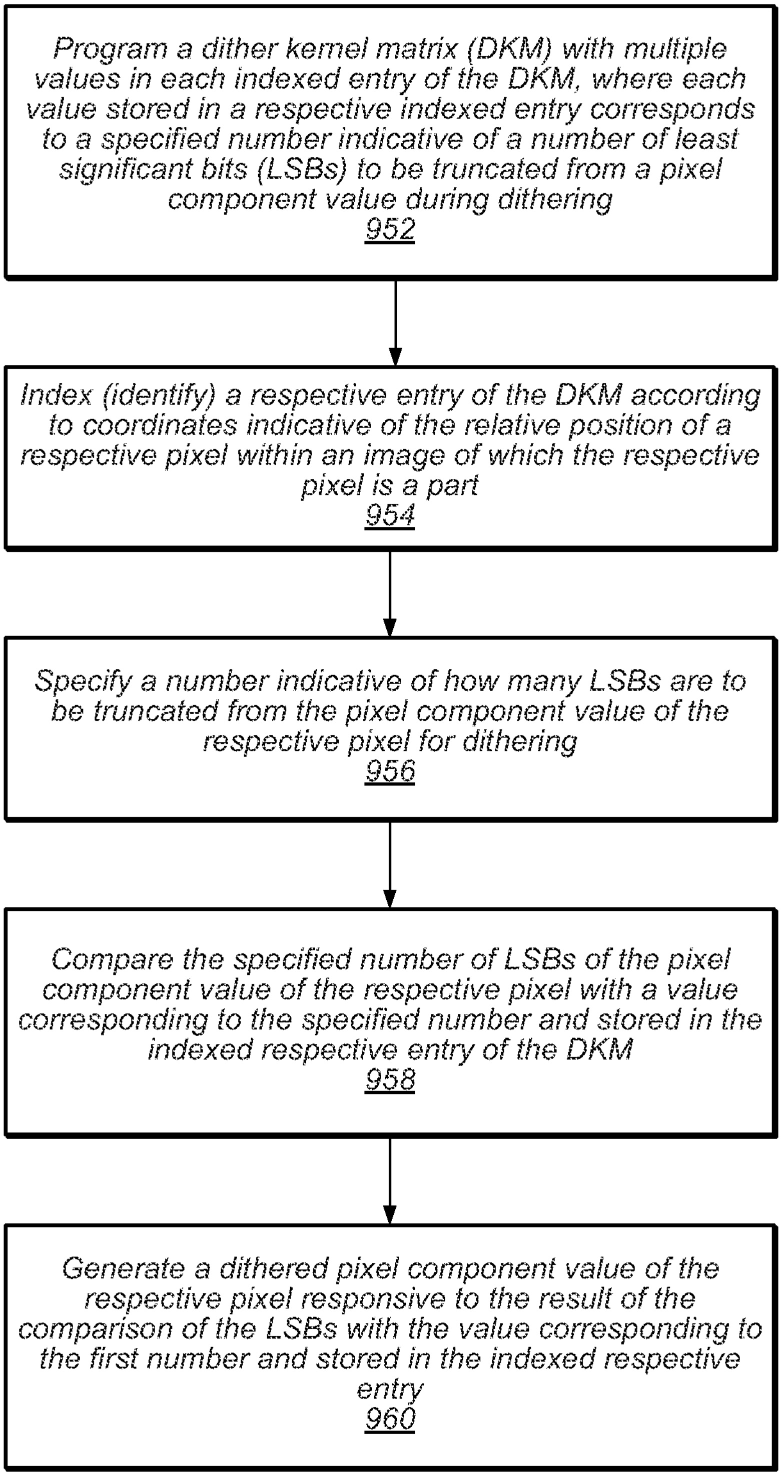
FIG. 9 is a flowchart of another embodiment of a method for performing dithering on an image.

FIG. 9 shows a flowchart of another embodiment of a method that includes performing dithering on an image. In this embodiment, a dither kernel matrix (DKM) is programmed with multiple values in each indexed entry of the DKM, where each value stored in a respective indexed entry corresponds to a specified number indicative of a number of least significant bits (LSBs) to be truncated from a pixel component value during dithering (952). A respective entry of the DKM is then indexed (i.e., the respective entry in the DKM may be identified) according to coordinates indicative of the relative position of a respective pixel within an image of which the respective pixel is a part (954). In addition, a number is specified to indicate how many LSBs are to be truncated from the pixel component value of the respective pixel for dithering (956). In other words, the specified number is the number of LSBs that is truncated from the pixel component value of the respective pixel as part of the dithering operation. The LSBs (the number of LSBs indicated by the specified number) of the pixel component value of the respective pixel are compared with a value corresponding to the specified number and stored in the indexed respective entry (958). That is, the value represented by the LSBs is compared to the value stored in the indexed respective entry and corresponding to the specified number (i.e. the number of LSBs being truncated from the pixel component value). Finally, a dithered pixel component value of the respective pixel is generated responsive to the result of the comparison of LSBs with the value corresponding to the first number and stored in the indexed respective entry (960).

In some embodiments, generating the dithered pixel value includes splitting the pixel component value into the specified number of LSBs and a specified number of most significant bits (MSBs), where typically the number of MSBs is determined as the MSBs remaining after the specified number of LSBs have been truncated from the pixel component value. The MSBs may then be adjusted responsive to comparing the value represented by the specified number of LSBs with the value corresponding to the specified number (indicative of the number of truncated LSBs) and stored in the indexed respective entry, and the adjusted MSBs may be output as the dithered pixel component value. The adjustment of the MSBs may involve adding a binary value of '1' to the MSBs responsive to the specified number of LSBs representing a value larger than the value corresponding to the specified number (indicative of the number of truncated LSBs) and stored in the indexed respective entry, and leaving a value represented by the MSBs unchanged responsive to the LSBs representing a value less than or equal to the value corresponding to the specified number (indicative of the number of truncated LSBs) and stored in the indexed respective entry. In some embodiments, leaving the value represent by the MSBs unchanged may involve adding a binary value of '0' to the MSBs.

Numerous variations and modifications will become apparent to those skilled in the art once the above disclosure is fully appreciated. It is intended that the following claims be interpreted to embrace all such variations and modifications.

We claim:

1. A dither unit comprising:

a dither control circuit comprising a programmable dither kernel matrix, wherein each entry of the programmable dither kernel matrix comprises a plurality of values, and wherein each of the plurality of values corresponds to a respective kernel number, the dither control circuit configured to:
  - receive a pixel component value corresponding to a pixel of an image;
  - receive at least a portion of horizontal and vertical coordinates indicative of a relative position of the pixel within the image;
  - receive a kernel number indicative of how many least significant bits are to be truncated from the pixel component value;
  - truncate one or more least significant bits from the pixel component value according to the kernel number;
  - select a matrix value from the programmable dither kernel matrix according to the kernel number and the at least a portion of the horizontal and vertical coordinates; and
  - generate a dither kernel value according to the matrix value and the one or more least significant bits of the pixel component value; and an adder coupled to receive the dither kernel value and a plurality of most significant bits of the pixel component value, wherein the plurality of most significant bits exclude the one or more least significant bits of the pixel component value, and wherein the adder is configured to add the dither kernel value to the most significant bits of the pixel value to generate a dithered output pixel value.

2. The dither unit of claim 1, further comprising a separator circuit configured to receive the pixel component value, and separate the pixel component value into the one or more least significant bits and the plurality of most significant bits of the pixel component value.

3. The dither unit of claim 1, wherein the dither control circuit is configured to:

index an entry in the dither kernel matrix according to the at least a portion of the horizontal and vertical coordinates; and select the matrix value stored at the indexed entry to generate the dither kernel value.

4. The dither unit of claim 3, wherein the dither control circuit is configured to select the matrix value stored at the indexed entry according to the kernel number.

5. A method for dithering, the method comprising:

receiving, by a computing hardware device, a first number of least significant bits (LSBs) of a pixel component value corresponding to a pixel of an image;

receiving, by the computing hardware device, at least a portion of horizontal and vertical coordinates indicative of a position of the pixel within the image;

receiving, by the computing hardware device, a kernel number indicative of how many least significant bits are to be truncated from the pixel component value;

receiving, by the computing hardware device, a third number of most significant bits (MSBs) of the pixel component value;

retrieving, by the computing hardware device, a dither value from a programmable dither kernel matrix according to the at least a portion of horizontal and vertical coordinates and the kernel number, wherein each entry in the programmable dither kernel matrix stores a plurality of values, wherein each value of the plurality of values within the entry corresponds to a different kernel number; and generating, by the computing hardware device, a dithered output pixel component value from the third number of MSBs, the first number of LSBs, and the retrieved dither value.

6. The method of claim 5, wherein generating the dithered output pixel component value comprises:

comparing the first number of LSBs with the retrieved dither value; and performing an arithmetic operation on the third number of MSBs responsive to results of the comparing of the first number of LSBs with the retrieved dither value;

outputting a result of the arithmetic operation as the dithered output pixel component value.

7. The method of claim 6, wherein performing the arithmetic operation on the third number of MSBs comprises:

adding a binary value of '1' to the MSBs in response to the comparing indicating that the first number of LSBs is greater than the retrieved dither value.

8. The method of claim 6, wherein performing the arithmetic operation on the third number of MSBs comprises:

adding a binary value of '0' to the MSBs in response to the comparing indicating that the first number of LSBs is less than or equal to the retrieved dither value.

9. The method of claim 5, wherein retrieving the dither value from the programmable dither kernel matrix comprises selecting one from a plurality of stored dither values according to the kernel number, wherein the plurality of stored dither values correspond to the at least a portion of horizontal and vertical coordinates.

10. A system comprising:

a memory element configured to store images comprising pixels, each pixel of the pixels represented by color component values in a specified color space, and each pixel having relative coordinates within a respective image of the stored images that comprises the pixel;

a non-real-time (NRT) peripheral circuit comprising a programmable kernel matrix, wherein each entry in the programmable kernel matrix stores a plurality of values, wherein each value of the plurality of values within the entry corresponds to a different kernel number, the NRT peripheral circuit configured to:

communicate with the memory element to retrieve the stored images, and for each retrieved pixel of the retrieved stored images:

retrieve a dither value from the programmable kernel matrix according to relative coordinates of the retrieved pixel, and a kernel number indicative of how many least significant bits (LSBs) are truncated from the color component value representing the retrieved pixel; and generate a dithered color component value of the retrieved pixel based on the retrieved dither value, LSBs truncated from the color component value, and a second number of most significant bits (MSBs) of the color component value representing the retrieved pixel, to generate dithered pixels to represent a dithered image; and store the dithered image in the memory element.

11. The system of claim 10, wherein in retrieving the dither value from the programmable kernel matrix, the NRT peripheral circuit is configured to index the programmable kernel matrix according to the relative coordinates of the retrieved pixel within the image.

12. The system of claim 10, wherein the programmable kernel matrix is configured to store a plurality of values corresponding to the relative coordinates of the retrieved pixel within the image, wherein each of the plurality of values corresponds to a different respective kernel number.

13. The system of claim 10, wherein in generating the dithered color component value of the retrieved pixel, the NRT peripheral circuit is configured to:

compare the LSBs truncated from the color component value with the retrieved dither value;

adjust the second number of MSBs responsive to comparing the LSBs truncated from the color component value with the retrieved dither value; and output the adjusted second number of MSBs as the dithered color component value of the retrieved pixel.

14. The system of claim 10, wherein the NRT peripheral circuit is further configured to:

retrieve a respective dither value for each respective color component value of the retrieved pixel according to the relative coordinates of the retrieved pixel within the image, and the kernel number; and generate a dithered respective color component value of the retrieved pixel based on the retrieved respective dither value, LSBs truncated from the respective color component value of the retrieved pixel, and a respective number of most significant bits (MSBs) of the respective color component value of the retrieved pixel, to generate dithered pixels to represent the dithered image.

15. The system of claim 10, wherein the color component value is representative of one of:

an RGB color space; and a YCbCr color space.

16. A method comprising:

programming, in computing hardware device, a dither kernel matrix (DKM), with a plurality of values in each indexed entry of the DKM, wherein each of the plurality of values stored in a respective indexed entry corresponds to a respective kernel number indicative of a number of least significant bits (LSBs) to be truncated from a pixel component value during dithering;

indexing a respective entry of the DKM according to coordinates indicative of a relative position of a respective pixel within an image of which the respective pixel is a part;

specifying a current kernel number indicative of a number of LSBs truncated from the pixel component value of the respective pixel for dithering;

selecting a DKM value corresponding to the current kernel number and stored in the indexed respective entry of the DKM;

comparing, by the computing hardware device, the LSBs truncated from the pixel component value of the respective pixel with the DKM value; and generating ,by the computing hardware device, a dithered pixel component value of the respective pixel responsive to comparing the first number of LSBs with the value corresponding to the first number and stored in the indexed respective entry.

17. The method of claim 16, wherein generating the dithered pixel component value comprises:

splitting the pixel component value into the LSBs truncated from the pixel component value of the respective pixel and a second number of most significant bits (MSBs);

adjusting the second number of MSBs responsive to comparing the of LSBs truncated from the pixel component value of the respective pixel with the selected DKM value; and outputting the adjusted second number of MSBs as the dithered pixel component value.

18. The method of claim 17, wherein adjusting the second number of MSBs comprises:

adding a binary value of '1' to the second number of MSBs responsive to the LSBs truncated from the pixel component value of the respective pixel representing a value larger than the selected DKM value; and leaving a value represented by the second number of MSBs unchanged responsive to the LSBs truncated from the pixel component value of the respective pixel representing a value less than or equal to the selected DKM value.

19. The method of claim 17, wherein leaving the second number of MSBs unchanged comprises adding a binary value of '0' to the second number of MSBs.

20. A system comprising:

a memory element configured to store images comprising pixels, each pixel of the pixels represented by pixel component values in a specified color space;

a programmable dither kernel matrix (DKM) configured to store two or more values in each entry of the DKM, wherein each stored value of the stored two or more values corresponds to a respective number indicative of how many least significant bits (LSBs) are to be truncated from a pixel component value during dithering;

a dithering circuit coupled to the memory element and to the programmable DKM to perform dithering, wherein in performing dithering the circuit is configured to:

receive a pixel component value corresponding to a pixel of an image and comprising a first number of LSBs and a second number of most significant bits (MSBs), wherein the first number of LSBs are to be truncated from the pixel component value;

receive at least a portion of horizontal and vertical coordinates indicative of a relative position of the pixel within the image;

identify a respective entry in the DKM according to the at least a portion of horizontal and vertical coordinates retrieve, according to the first number, a respective value stored within the identified respective entry of the DKM;

generate a dither kernel value according to the first number of LSBs and the retrieved respective value; and output a dithered pixel component value responsive to the dither kernel value and the second number of MSBs.

21. The system of claim 20, wherein the circuit comprises:

an adder configured to add the dither kernel value to the second number of MSBs to generate the dithered pixel component value.

22. The system of claim 20, further comprising a non-real-time (NRT) scaler/rotator circuit coupled to the memory element to receive images from the memory element, scale/rotate the received images, and store the scaled/rotated images in the memory element;

wherein the programmable DKM and the dithering circuit are comprised in the NRT scaler/rotator, wherein the dithering circuit is configured to perform dithering as part of scaling/rotating the images.

* * * * *

UNITED STATES PATENT AND TRADEMARK OFFICE

CERTIFICATE OF CORRECTION

PATENT NO. : 8,963,946 B2
APPLICATION NO. : 13/238023
DATED : February 24, 2015
INVENTOR(S) : Brijesh Tripathi et al.

It is certified that error appears in the above-identified patent and that said Letters Patent is hereby corrected as shown below:

In the Claims:

Claim 17, Column 20, Line 33, please delete "the of" and substitute -- of --

Signed and Sealed this
Seventh Day of July, 2015

Michelle K. Lee

Michelle K. Lee
*Director of the United States Patent and Trademark Office*